US012763855B2

(12) United States Patent
Scifres et al.

(10) Patent No.: US 12,763,855 B2
(45) Date of Patent: Oct. 13, 2026

(54) SYSTEMS, DEVICES AND METHODS FOR MANAGING DISTRIBUTION OF FIBER OPTIC SIGNALS WITHIN STRUCTURES

(71) Applicant: Pavlov Media, Inc., Champaign, IL (US)

(72) Inventors: Mark Scifres, Champaign, IL (US); John Danner, Champaign, IL (US)

(73) Assignee: Pavlov Media, Inc., Champaign, IL (US)

( * ) Notice: Subject to any disclaimer, the term of this patent is extended or adjusted under 35 U.S.C. 154(b) by 526 days.

(21) Appl. No.: 18/194,635

(22) Filed: Apr. 1, 2023

(65) Prior Publication Data

US 2023/0327766 A1 Oct. 12, 2023

Related U.S. Application Data

(60) Provisional application No. 63/326,811, filed on Apr. 1, 2022.

(51) Int. Cl.

| | |
|---|---|
| ***H04B 10/27*** | (2013.01) |
| ***H04B 10/25*** | (2013.01) |
| ***H04B 10/80*** | (2013.01) |

(52) U.S. Cl.

CPC ............. *H04B 10/27* (2013.01); *H04B 10/25* (2013.01); *H04B 10/806* (2013.01)

(58) Field of Classification Search

CPC ...... H04B 10/27; H04B 10/25; H04B 10/806; H04B 10/25754; H04B 10/40; H04B 10/0795; H04B 10/808

See application file for complete search history.

(56) References Cited

U.S. PATENT DOCUMENTS

| | | | | |
|---|---|---|---|---|
| 6,192,398 | B1 | 2/2001 | Hunt | |
| 6,275,496 | B1 | 8/2001 | Burns | |
| 8,615,577 | B2 | 12/2013 | Black | |
| 10,261,938 | B1 | 4/2019 | Jenkins | |
| 2002/0019990 | A1 | 2/2002 | Sincaglia | |
| 2002/0198937 | A1 | 12/2002 | Diwan | |
| 2004/0098625 | A1 | 5/2004 | Lagadec | |
| 2006/0268759 | A1* | 11/2006 | Emery | H04B 10/077 370/321 |
| 2008/0060013 | A1 | 3/2008 | Sarukkai | |
| 2008/0117863 | A1* | 5/2008 | Cotton | H04L 12/2856 370/328 |

(Continued)

*Primary Examiner* — Hibret A Woldekidan

(74) *Attorney, Agent, or Firm* — James E. Eakin

(57) ABSTRACT

Methods and systems for providing WAN, LAN and power to allocated spaces such as offices, apartments, condominiums, or dormitories comprises a plurality of fiber taps configured to interface with optical fiber communications incoming from an ISP and also to interface with a local supply of power. The combined communications and power are distributed to downstream equipment including customer premises equipment, including conversion of the ISP's protocol into one or more protocols appropriate for interfacing with the downstream devices through the use of one or more specially-configured fiber gateways, plates and fiber media converters. Power line monitoring and management permits local and remote monitoring and control of each branch of the the local network, including detection of excessive power use or loss of power indicating an alarm or warning condition.

20 Claims, 10 Drawing Sheets

(56) References Cited

U.S. PATENT DOCUMENTS

| | | | |
|---|---|---|---|
| 2008/0154879 | A1 | 6/2008 | Lin |
| 2009/0234968 | A1 | 9/2009 | Thomas |
| 2010/0214921 | A1 | 8/2010 | Sau |
| 2010/0223364 | A1 | 9/2010 | Wei |
| 2011/0099226 | A1 | 4/2011 | Liu |
| 2012/0017050 | A1 | 1/2012 | Kraiman |
| 2012/0109902 | A1 | 5/2012 | Rozensztejn |
| 2012/0144117 | A1 | 6/2012 | Weare |
| 2012/0159558 | A1 | 6/2012 | Whyte |
| 2013/0145001 | A1 | 6/2013 | Qian |
| 2013/0159383 | A1 | 6/2013 | Tuliani |
| 2013/0159473 | A1 | 6/2013 | Newton |
| 2014/0314412 | A1* | 10/2014 | Soto .................... H04B 10/272 398/67 |
| 2015/0084416 | A1* | 3/2015 | Nishibayashi ...... H02J 13/1321 307/12 |
| 2017/0201571 | A1 | 7/2017 | Sherf |
| 2019/0124425 | A1* | 4/2019 | Elford .................... G02B 6/504 |
| 2021/0309425 | A1 | 10/2021 | Hiltser et al. |

* cited by examiner

Figure 1 [Prior Art]

FIGURE 2 IN HOME

FIGURE 3 CONDO HI-RISE

FIGURE 4 MDU (EXISTING CONSTRUCTIONS)

FIGURE 5 MDU (NEW CONSTRUCTIONS)

FIGURE 6 OFFICE
220
215
220
PLATE
WAN LAN POWER
TAP
250
TUNER TENNA
230
FMC
LAN POWER
255
PC
260
CAMERA
265
TV
235
AP
225
GATE
ONE PER OFFICE AT ANY PLATE
205
ISP FIBER DMARC
ISP FIBER LINE
AT ANY TAP OR GATE
POWER SUPPLY
210
PERMANENTLY INSTALLED AT ANY TAP

Figure 8 – Gateway 10G/25G

Fiber Media Converter
10G/25G

Figure 10 – Tap Power Monitoring and Management
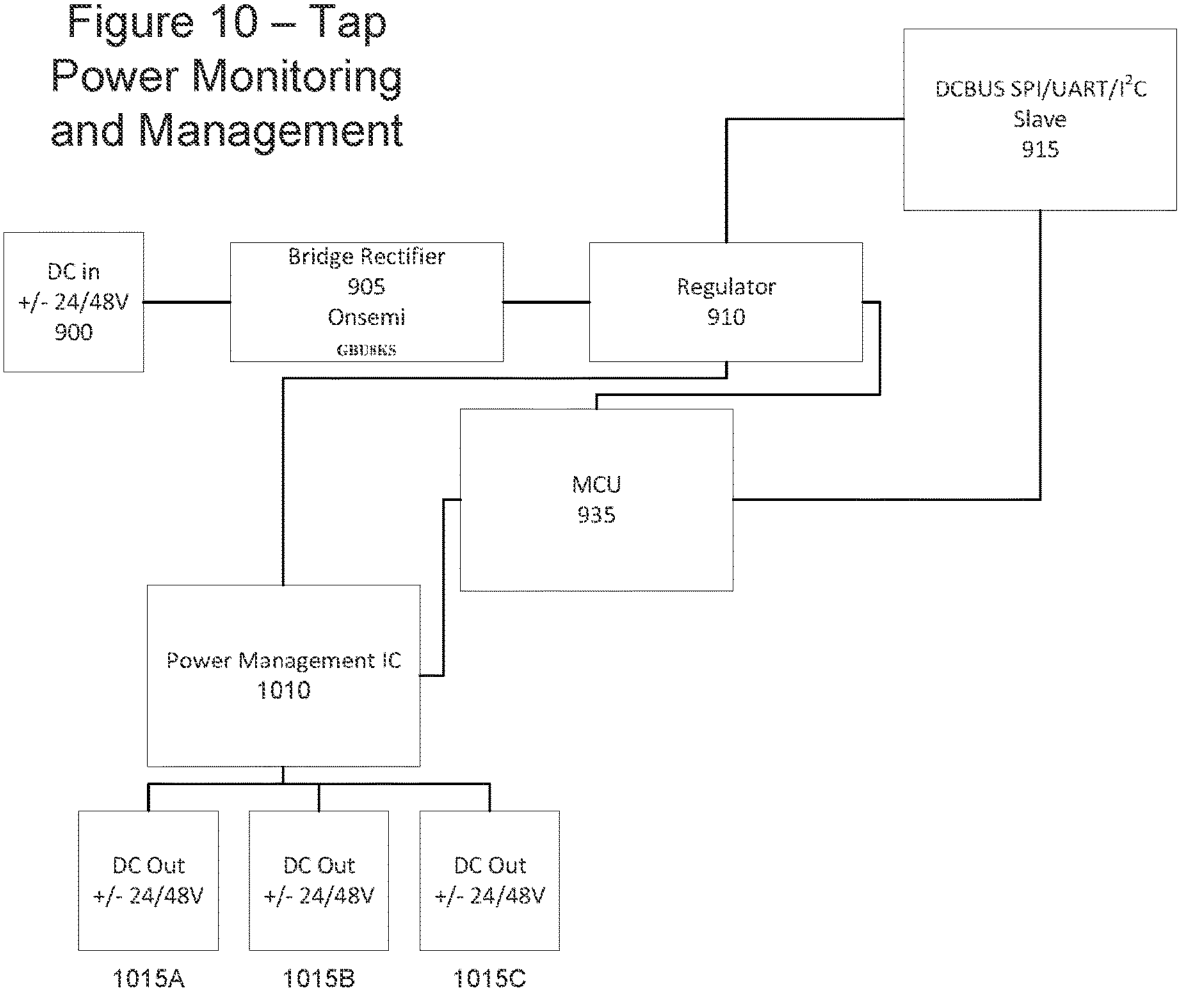

SYSTEMS, DEVICES AND METHODS FOR MANAGING DISTRIBUTION OF FIBER OPTIC SIGNALS WITHIN STRUCTURES

RELATED APPLICATION

The present application is a conversion of and claims the benefit of U.S. Patent Application Ser. No. 63/326,811, filed Apr. 1, 2023 and incorporated herein in full by reference.

FIELD OF THE INVENTION

The present invention relates generally to information distribution networks, and more specifically relates to systems and methods for managing distribution of signals over fiber optic networks within structures, especially homes, including multifamily dwellings, and office buildings.

BACKGROUND OF THE INVENTION

Distributing internet signals within an office building, an apartment complex, or even a large home, has historically presented a number of infrastructure challenges. When telephone land lines coupled to a modem were the primary method for accessing the internet, typical installations used a "wire pair", or a pair of copper wires, for every different phone number within that building, with the associated wire pair or pairs going to each physical space with the building. Telephone "closets" with conduits several inches in diameter were used to enable the distribution of those communications signals within the building.

Although dial-up modems are no longer used, and internet download speeds have increased dramatically, the use of copper wire pairs is still common in many structures, with all of their attendant limitations. Coaxial copper wire cable, such as used for cable television improves upon wire pairs in many instances, but most such systems suffer from decades-old designed intended only to download data, not upload it. The result is that many cable systems provide much slower upload speeds than download speeds. Further, distribution of cable signals within a dormitory, an apartment building, an office building or even a large home involves significant infrastructure costs and presents risks of data leakage.

Optical fiber favorably addresses many of the limitations of wire pair and coaxial cable systems including symmetric upload and download speeds, less risk of data leakage and—perhaps most important to most customers—faster data transmission speeds than either wire pairs or coaxial cable. However, optical distribution networks (ODN's) for distribution of optical fiber-based data within MDU's or commercial buildings typically can also involve significant cost for installation and signal distribution. In some parts of the world, particularly in the Middle East, point-to-point (P2P) installations are common where each apartment or office gets its own optical fiber from the point of presence external to the building, for example an external distribution box. The P2P approach can involve running a significant quantity of fiber optic cables with the attendant cost and risk of damage to the fiber optic cable. Alternative approaches to an ODN, more common in most parts of the world, involve Passive Optical Network ("PON") architectures, a general example of which is shown in FIG. 1 [Prior Art].

In FIG. 1, a service node 100 comprises a point of presence from the ISP providing fiber optic service. The service node interface (SNI), brings the optical fiber into the MDU or other building, where it connects to an Optical Line Terminal (OLT) 110. The OLT converts the signals used by the ISP to the frequency and framing used by the PON system. Various types of PON's exist, including EPON, GPON, XG-PON, XGS-PON and NG-PON. EPON, or Ethernet PON, uses the well-known packet-based messaging approach, whereas GPON, or Gigabit PON, uses Asynchronous Transfer Mode (ATM) with cells of fixed size rather than variably sized packets. XG-PON, XGS-PON and NG-PON are faster version of GPON, where XG-PON is asymmetric while XGS-PON offers symmetric upstream and downstream speeds, and NG-PON is next-gen PON and typically uses TDM and/or WDM to provide further improvements in network performance. The OLT 110 typically connects to the ODN 115 for the various customer premises, where the ODN may for example be using XGS-PON 120. More specifically, the OLT typically connects to an optical splitter 125 that allows a single PON interface to be shared among many subscribers, each with their own optical network units (ONU's) 130, also known as optical network terminals (ONT's) which in turn feed each customer's premises equipment (CPE) 140. In a typical arrangement, the OLT multiplexes the traffic to/from the service node to the CPE of all of the subscribers. The ONT's can serve as a gateway to the CPE, or can serve as a bridge between the OLT and a gateway provided by each customer's CPE.

While FIG. 1 provides a general view of an ODN for an MDU or commercial building, in practice most properties have installed only old phone, coax, or Ethernet cabling. Most of that infrastructure is multiple decades old, and is insufficient to meet the download and upload speeds that will soon be demanded by customers, if not demanded already. Computers today ship with USB and Ethernet ports capable of speeds up to 40 Gbps, and the lack of suitable fiber infrastructure to the home or office both limits performance of that customer equipment, and burdens the national backbone due to latency.

At the same time, developing the last mile fiber infrastructure has presented a series of issues, including challenges in distributing fiber to the individual living or office spaces. Developing a fiber distribution network has proven especially difficult in smaller, underserved communities, for example college towns not near Tier 1 cities. Further, reliable distribution of power to customer premises equipment (CPE), including customer access points, across the ODN has proven challenging for such fiber networks. An additional limitation of existing networks has been their inability to readily convert fiber media to conventional older media such as phone, Ethernet, and so on.

Thus, there has been a need for a system and method for providing fiber infrastructure and associated line power to office buildings and dwelling units such as houses, condominiums, apartment buildings, dormitories, and the like, including media conversion to enable use of existing infrastructure.

SUMMARY OF THE INVENTION

The present invention substantially overcomes many of the limitations of the prior art by providing methods and systems for provisioning, in one aspect, a communications network topology, which in some embodiments can be thought of as a local ODN, for distributing both fiber optic signals and power across a variety of dwellings, including homes, condominiums, multiple dwelling units such as apartment buildings, dormitories and the like, and offices. Such embodiments enable interfacing an ISP's fiber from the SNI or similar boundary or demarcation point to customer premises equipment including, in at least some embodiments, the ability to use at least portions of existing infrastructure. The ISP's fiber optic cable is typically suitable for transmitting data and command signals to and from the downstream portion of a network and connects to a PON network within the structure, typically either EPON, GPON or similar protocol. Embodiments suitable for use in retrofitting an existing structure can be configured to supply network communications and power through the use of only a single fiber and power line as a backbone, with fiber taps at each allocated space. The single fiber and power line can, in at least some embodiments, be supplied to the building through a microconduit.

In some embodiments, the topology of the local ODN comprises a plurality of fiber taps configured to receive suitably formatted optical signals from the ISP and to receive power for distribution across the local ODN. One or more novel fiber gateways, where the number depends upon the configuration of the structure, interface with the ISP's fiber signals and incoming power and provide WAN (EPON, GPON, etc.) and LAN (copper) services, and well as power, to the remainder of the associated space.

Depending upon the embodiment, the fiber gateway connects ISP fiber, PON fiber (EPON, GPON, XG-PON, XGS-PON, NG-PON, etc.) and power to at least some of the taps which in term provide those services to one or more plates, with, typically, at least one plate per space where CPE may be located. The plate cooperates with an associated fiber media converter (FMC) to provision the CPE located in that space by providing at least LAN and power, and fiber if appropriate. The CPE can comprise any conventional network- or PC-connected device such as PC's, USB ports, wireless access points, TV's, digital antennas, cameras, and other sensors or I/O devices.

In an additional aspect of the invention, power line monitoring and management can be provided, for example, by the gateway, through the use of a CAN bus protocol or similar, such as Power over Data Line (PoDL) or Single Pair Ethernet, to ensure that power supplied by the system of the invention to connected consumer devices is on and within the limits of the network's power budget. In the event of excessive power usage, suitable warnings or alarms can be generated including messaging a dashboard or remote system. In some embodiments the power line management aspect of the invention permits selectively enabling or disabling the LAN, PON and power services provided by the invention to a selected space. The power monitoring and management functions can be implemented using various protocols, including but not limited to CAN bus, Power over Data Line (PoDL), Power-over-Ethernet (POE, POE+ or POE++/UPOE), among others. It will be appreciated that at least some embodiments of the invention permit the communications network within a local dwelling space, a local office, an office building, or a multidwelling unit to be locally secured.

It is therefore one object of the present invention to provide a local optical distribution network configured to interface customer premises equipment to a fiber ISP.

It is another object of the present invention to provide, downstream from a single boundary point, WAN, LAN and power services to a plurality of separately allocated spaces such as offices, apartments, condos or rooms within a multidwelling, office or mixed use structure.

It is a still further object of the invention to provide an optical distribution network comprising in part its own power supply for supplying power to downstream equipment.

It is yet another object of the invention to provide an optical distribution network that can be managed and controlled locally or remotely via power lines integrated into the network.

It is a still further object of the present invention to provide a communications system that creates a locally secured network within a dwelling unit or other allocated space.

A still further object of the present invention is to provide an optical distribution network within a structure wherein a plurality of optical fiber demarcation points can be configured within the structure.

Yet another object of the present invention is to provide an optical distribution network capable of transforming protocol used by an ISP's optical fiber into one or more protocols needed for provisioning communications with downstream equipment.

Another object of the present invention is to provide power line monitoring and management on at least a per branch basis.

Still another object of the present invention is to monitor and manage separately the power usage of each branch of a local optical distribution network.

Yet a further object of the present invention is to enable provisioning of WAN and LAN within a plurality of separately allocated spaces of an existing structure by retrofitting with only a single fiber optic cable and a single power line.

These and other features and aspects of the invention can be better appreciated from the following detailed description, taken in combination with the appended Figures.

THE FIGURES

FIG. 1 [Prior Art] shows a conventional optical distribution network (ODN).

FIG. 10 illustrates in block diagram form an embodiment of the power management logic portion of a tap in accordance with an aspect of the present invention.

DETAILED DESCRIPTION OF THE INVENTION

The present invention comprises, in one aspect, a network topology for distribution of fiber optics and power across a variety of dwellings, including homes, condominiums, multiple dwelling units such as apartment buildings, dormitories and the like, and offices. In an embodiment, the local ODN comprises a novel fiber gateway 225 working in combination with a plurality of fiber media converters together with appropriate fiber taps and associating connecting plates where either a gateway or a fiber media converter can be attached to the plates. A related aspect of the present invention comprises power line monitoring using, in an embodiment, a CAN bus protocol or similar, such as Power over Data Line (PoDL) or Single Pair Ethernet, to ensure that power supplied by the system of the invention to connected consumer devices is on and within the limits of the network's power budget. These and other features and aspects of the invention can be better appreciated from the following detailed description, taken in combination with the appended Figures.

Figure 1:
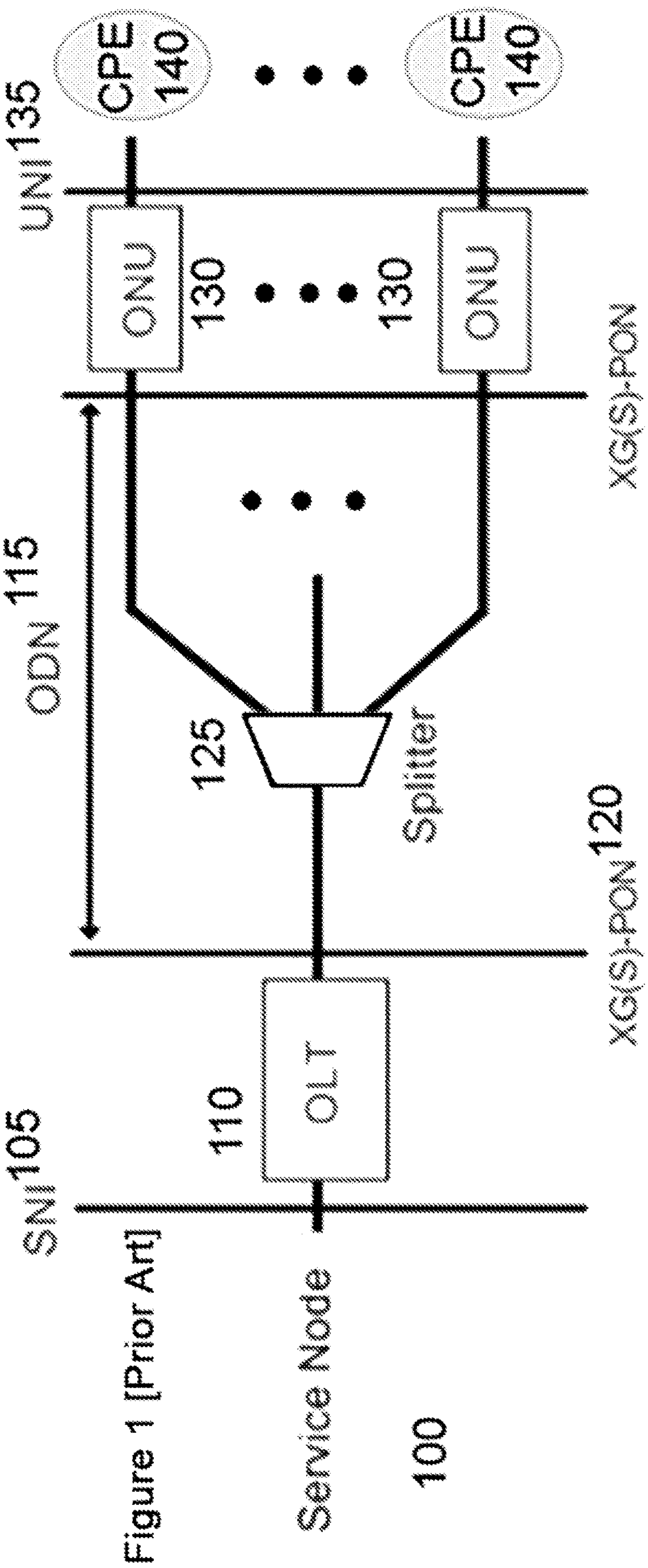
Figure 2:
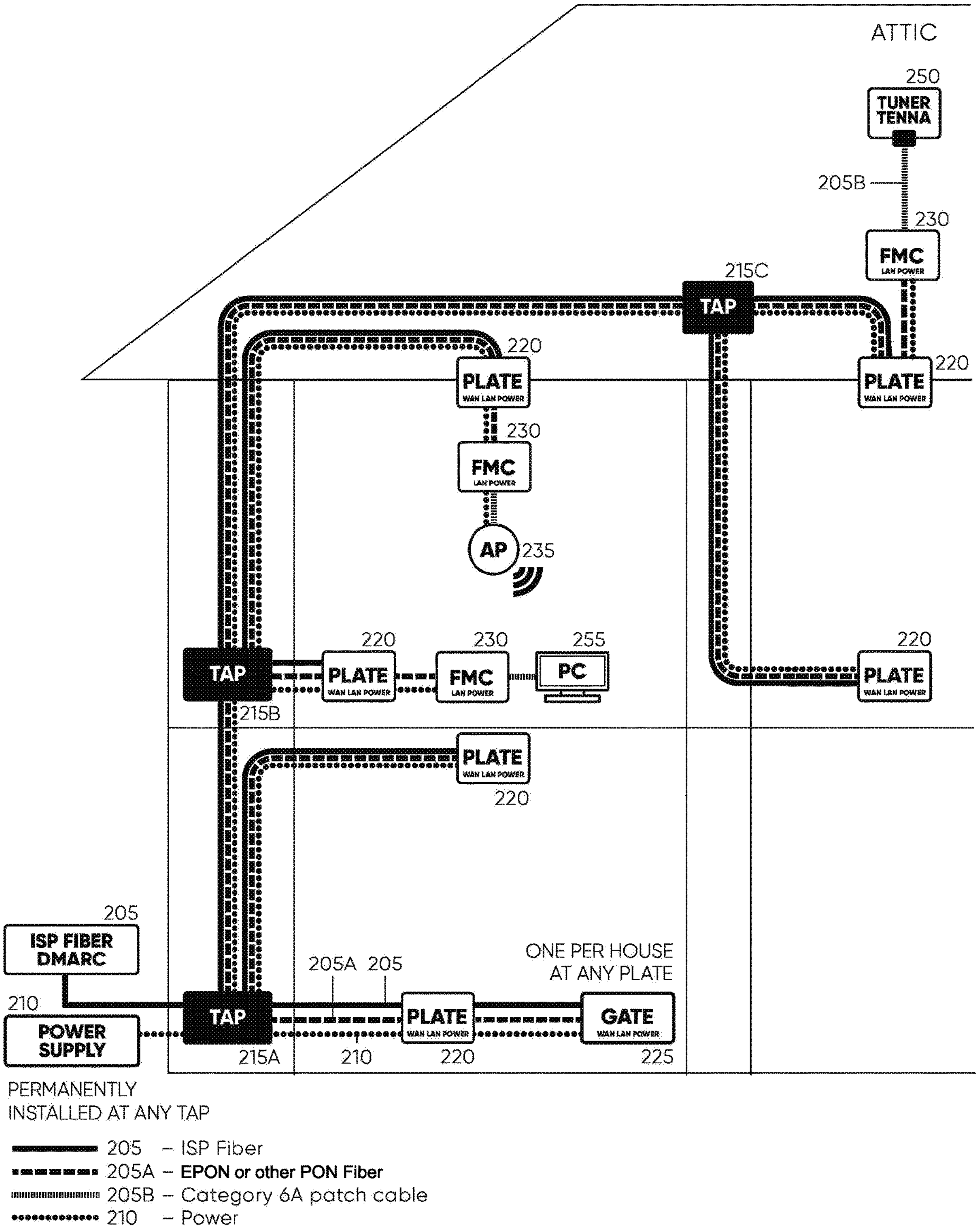
FIG. 2 illustrates schematically an ODN in accordance with an aspect of the present invention suitable for deployment in a home.

Referring first to FIG. 2, in an embodiment an ISP supplies to a single family dwelling or home 200 fiber optic cable 205 suitable for transmitting data and command signals to and from the remainder of the local network, including connecting to at least taps 215A-215C (described generally as 215 and in more detail hereinafter in connection with FIG. 10), plates 220 and gateway 225 (described hereinafter in connection with FIG. 8). Similarly, power is supplied via lines 210 to the taps 215, plates 220, gateway 225, and fiber media converters, or "FMC's" 230 (described hereinafter in connection with FIG. 9). In at least some embodiments, the plates 220 are configured to allow either a gateway 225 or an FMC 230 to connect, either directly or through appropriate cable connections. In most embodiments for a home deployment, only one gateway 225 is needed. The gateway 225 comprises in part a plurality of I/O ports, one or more for copper conductors such as Ethernet, and two or more for fiber where the ISP Fiber 205 connects to the system through one fiber I/O port, and another fiber I/O port connects via fiber cable 205A to the downstream devices. Depending upon the specific embodiment, the fiber cable 205A can supply any of 10 Gbps, 25 Gbps, or higher data rates.

In part, the gateway 225 functions as a conventional fiber gateway in that it reformats incoming fiber signals into whatever protocol the downstream devices need. In an embodiment, the incoming ISP fiber 205 uses a WAN format, whereas the downstream devices may need a LAN format. The gateway 225 may also serve as a pass-through of the WAN signal to the downstream taps 215. Further, in an embodiment, the gateway 225 includes power monitoring and management functions, including monitoring the power line status of the downstream taps 215 and FMC's 230. In an embodiment, the monitoring includes both confirmation that power is being supplied to the downstream devices, but also what the power drain is for each branch of the downstream network to ensure that no branch exceeds a threshold maximum. In the event the power drain of any branch or single devices exceeds a permissible power consumption threshold, a warning or alarm can be generated at a dashboard or other user interface, or can be transmitted to a supervisory system. The power monitoring and management functions can be implemented in some embodiments using a CAN bus protocol, in others using a Power over Data Line (PoDL) approach, and in still others using a Power-over-Ethernet (POE, POE+ or POE++/UPOE) approach.

Still referring to FIG. 2, the legend at the bottom of FIG. 2 applies to the cables shown in all of FIGS. 2 through 6. The cables in each case are typically distributed through a microconduit run through the walls or a wiring closet although the particular mode of distribution is not critical as long as the connections and data rates are preserved. Thus, for the example of FIG. 2, a room on a lower floor includes a tap 215A that receives the ISP cable 205 and power 210 and feeds not only the gateway 225 via the plate 220 on that floor but also feeds downstream taps 215B, 215C, etc. where the maximum number of taps is determined at least in part by the size of the space, the available power from upstream and the power drain downstream. The tap comprises in part a conventional fiber optic tap, but further includes power monitoring and management logic to permit that tap to communicate its power status and, if desired, the power status of all downstream devices including FMC's or customer premises equipment to the gateway 225 and execute any commands received via the gateway. This permits a plate 220 to be installed, for example, on a downstairs wall, where an FMC 230 can be mounted in order to provide data connection to a TV, security camera, fire or carbon monoxide alarm, an Ethernet switch, or any other suitable customer device. Further, the FMC can supply power to such customer devices, as appropriate for the device, thus removing the need either to rely on batteries or to have a conventional wall plug near the device. For example, the wireless access point 235 may be suitable to receive power solely from the FMC. While the power cable 210 is shown explicitly at the connection to access point 235, in many embodiments the patch cable with be configured for a version of Power over Ethernet, single pair Ethernet, or Power over Data Lines. It will be noted that, while the both WAN and LAN fiber cables reach each plate, only the LAN fiber cable connects to the FMC.

Similarly, in an exemplary embodiment, the cables 205, 205A and 210 connect to tap 215B which supports in an upstairs room a plate 220, FMC 230, and a personal computer 255 connected to the FMC by any convenient means, such as a patch cord 205B. As will be seen from the discussion of FIG. 9, below, the connection from the FMC 230 to the PC 255 can be any convenient form such as fiber, Ethernet, or other copper wire data cable. Along the same line, the tap 215B also feeds a wall-mounted plate in the upstairs room, to which is connected an FMC and a wireless access point 235 via a patch cable 265 or other convenient connection. Still further, the tap 215B feeds fiber data cables and power to tap 215C, which in turn splits the signal to two plates, one toward the floor and another higher up on the wall or, alternatively, in the attic. An FMC connected to the attic plate 220 can be connected by a patch cable 265 to a tuner tenna to permit capture of over-the-air signals such as television programs or similar, and have them stored in the PC 255 for later viewing or other use. While only four apartments are shown in FIG. 2, that number is exemplary and not limiting. The actual number of apartments can be considerably greater where the practical limit is driven by the type of data cable, the available power, and how many devices are connected. The Tuner-tenna comprises an integrated directional (flat or yagi) antenna and a fixed number of tuners (e.g., two to four) with enough storage to full time digitize those channels for up to a predetermined number of days.

Figure 3:
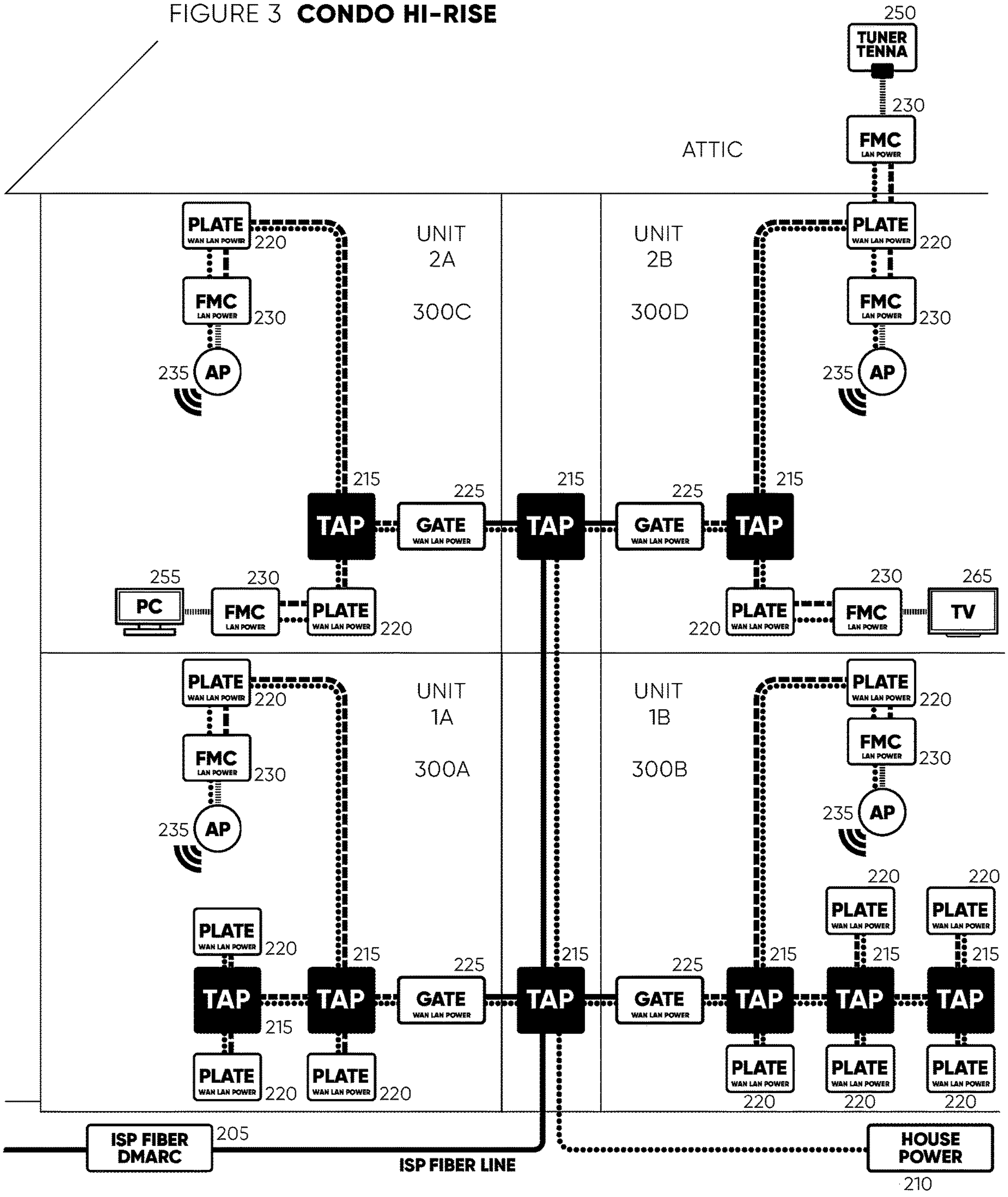
FIG. 3 illustrates schematically an ODN in accordance with the present invention suitable for deployment in a high rise condominium.

Referring next to FIG. 3, an embodiment of a network configuration similar to FIG. 2 is shown, but in this instance for a condominium complex, again showing an exemplary four units 300A-300D where each unit requires its own gateway 225 and centrally located taps 215, placed for example in a wiring closet, supply ISP fiber and power to each of the four gateways 225. The gateways each supply LAN fiber signals to one or more plates and FMC's, to which can be connected any desirable type of customer premises equipment. In some instances, where only one plate is needed, no additional tap 215 is deployed and the gateway 225 connects directly to the plate 220. In other instances, multiple taps 215 can be deployed, all daisy-chained similar to the arrangement in FIG. 2. As discussed with FIG. 2, depending upon the type of customer device connected to the FMC, the patch cable may provide sufficient power to support the customer device. In other instances, such as connections to a personal computer or television or the like, wall power may be used.

Figure 4:
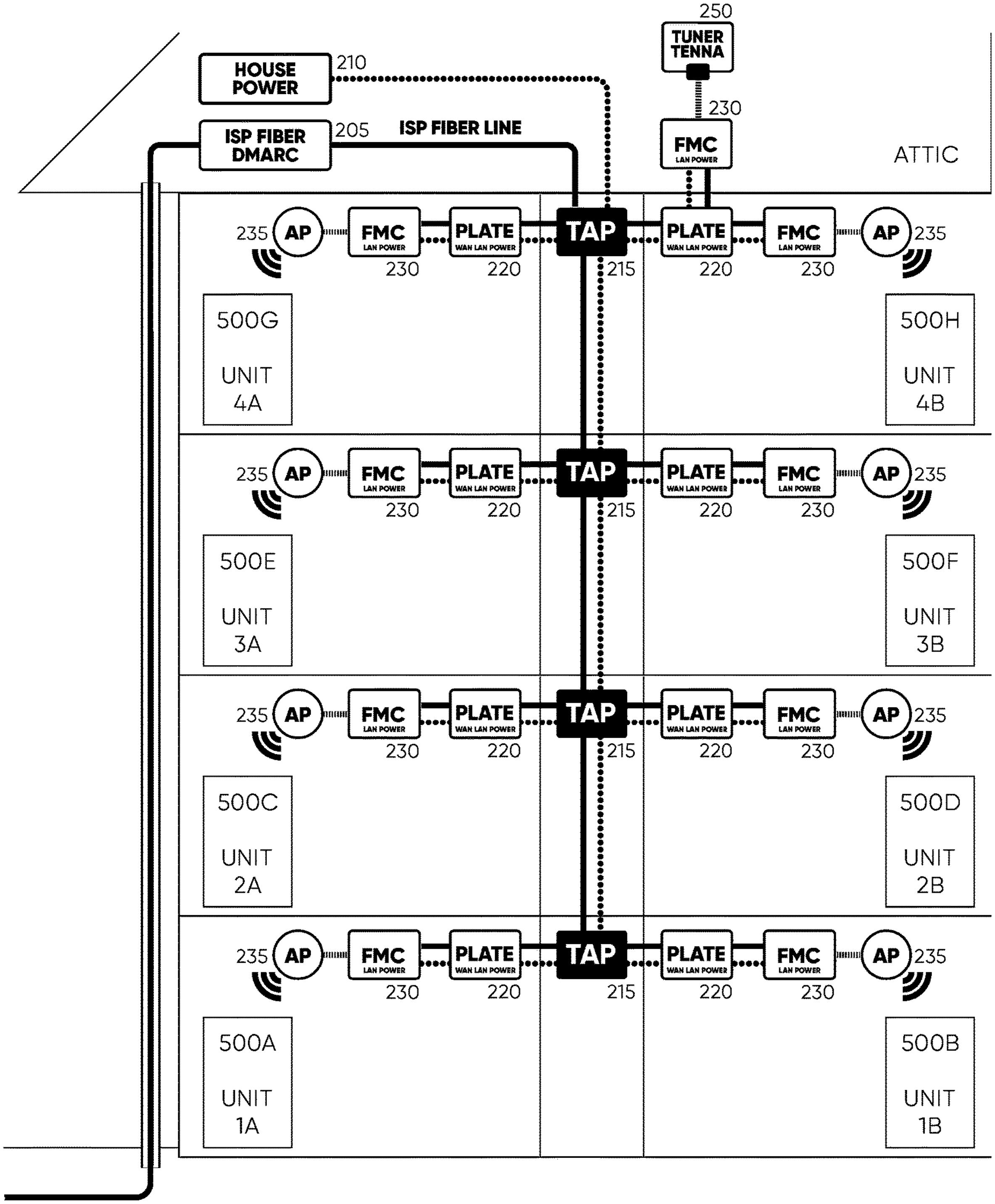
FIG. 4 illustrates schematically an ODN in accordance with an aspect of the present invention suitable for deployment in an existing multiple dwelling building such as an apartment building or dormitory.
Figure 5:
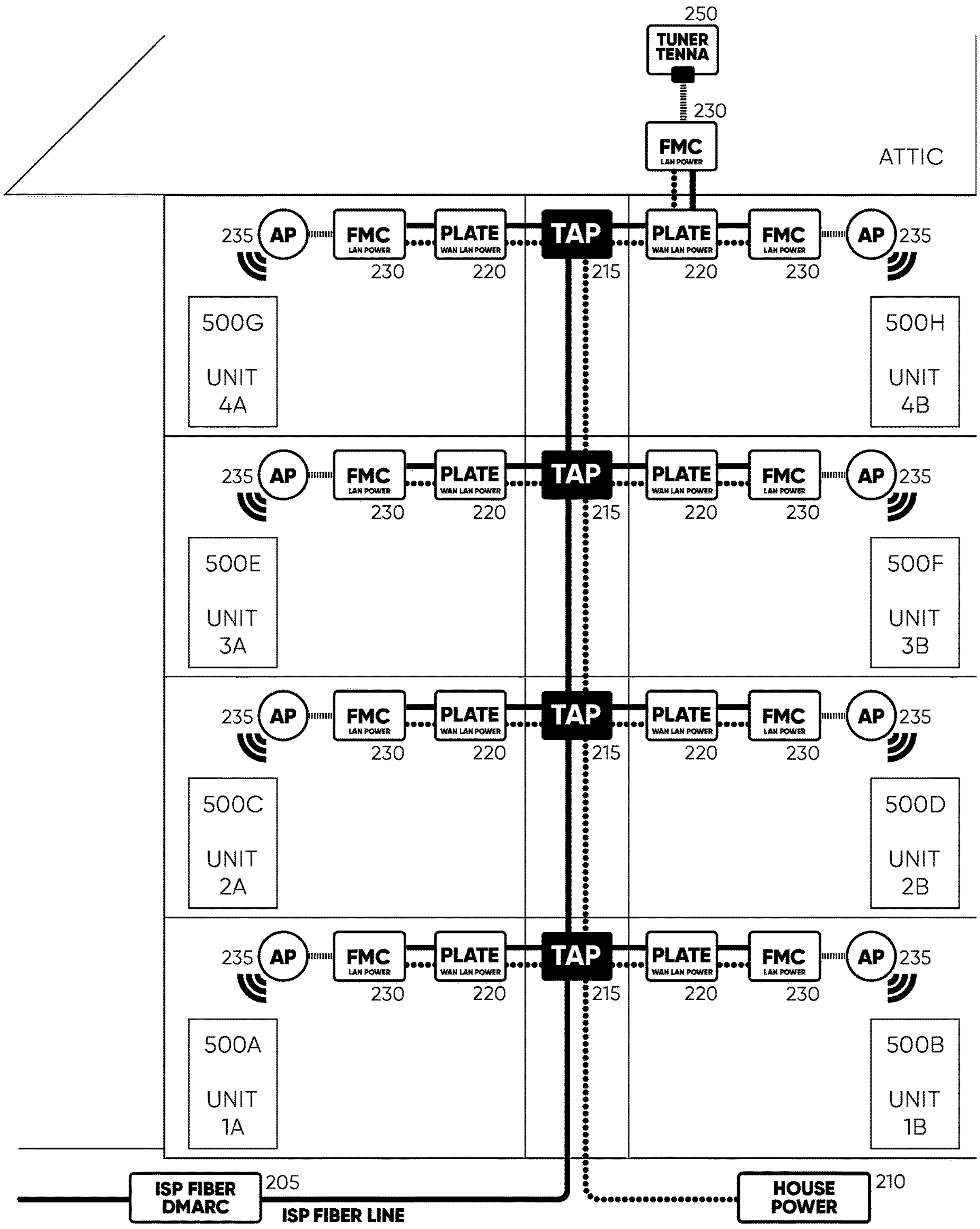
FIG. 5 illustrates schematically an ODN in accordance with an aspect of the present invention suitable for deployment in a newly constructed multiple dwelling building.

Referring next to FIGS. 4 and 5, embodiments of network configurations suitable either for retrofitting an existing multiple dwelling unit, such as a dormitory or the like, or for a newly constructed multiple dwelling unit. As with FIGS. 2 and 3, units 1A-4B are exemplary In these designs, it will be appreciated that no gateway is implemented, and ISP fiber 205 is supplied directly to each of taps 215, plates 220 and FMC's 230 in all of the units. The FMC's then support CPE such as access points 235 or other customer devices such as TV's and personal computers. For embodiments where it is desirable either to capture or to stream over the air transmissions, tuner tenna 250 can be deployed.

Figure 6:
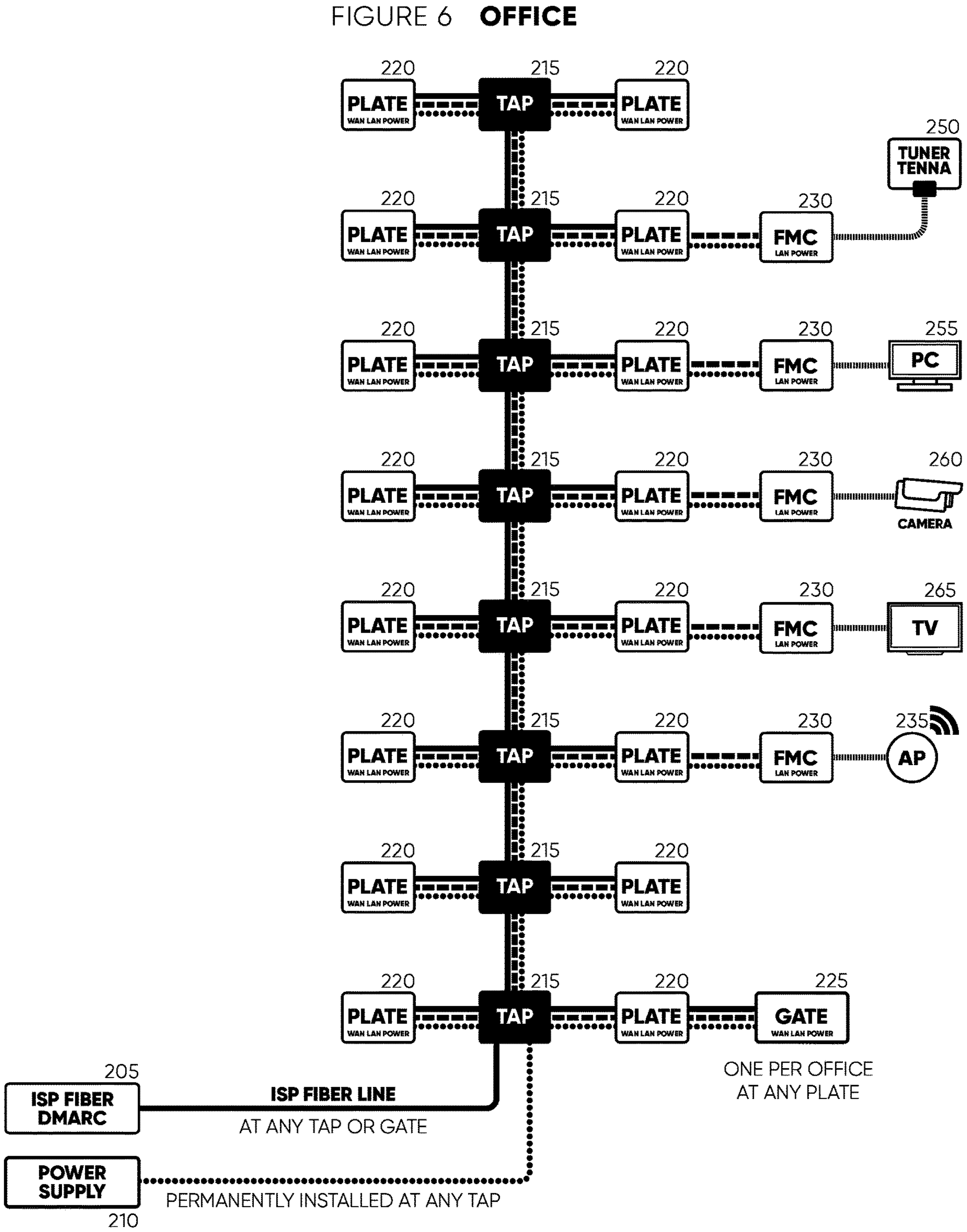
FIG. 6 illustrates schematically an ODN in accordance with an aspect of the present invention suitable for deployment in an office.

Referring next to FIG. 6, a network configuration suitable for an office environment is shown, where a single gateway 225 is deployed at any plate, and supplies LAN fiber signals to downstream taps, plates, FMC's and customer equipment such as PC's 225, access points 235, cameras 260 and TV's 265, among other devices including various IoT sensors such as might be found in refrigerators, alarm systems, HVAC controllers, and so on. As will the plates 220 in FIGS. 2-5, if compatible with either the WAN ISP fiber 205 or the LAN fiber 205A, and also mechanically and electrically compatible with the plate connections, a customer device may be connected directly to the plates 220.

Figure 7:
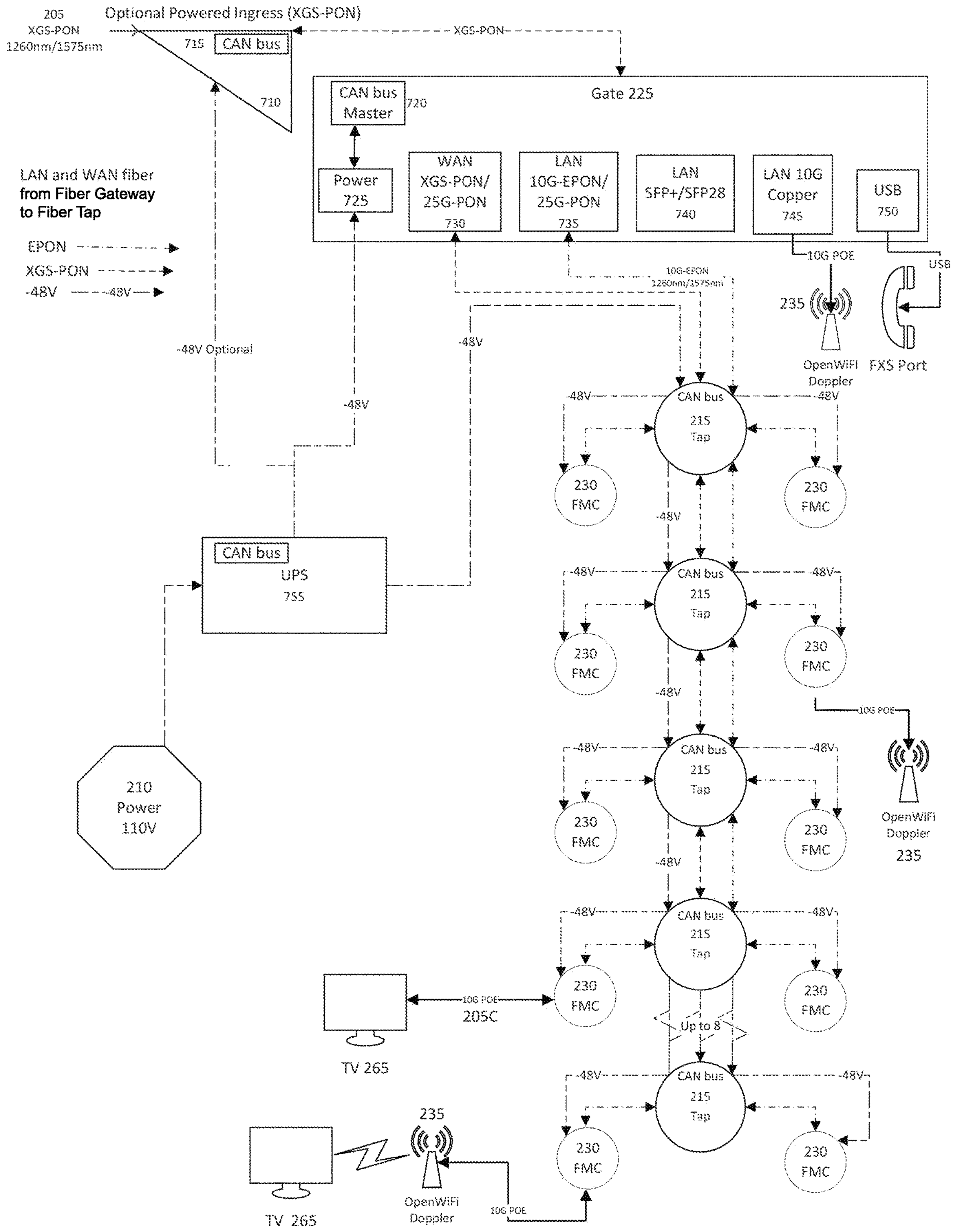
FIG. 7 illustrates in greater detail an ODN in accordance with an aspect of the present invention.

Referring next to FIG. 7, an exemplary network configuration can be better understood. Fiber 205, for example XGS-PON carrying 1260 nanometer and 1575 nanometer signals, connects to a gateway 225. In some embodiments, power supply 210 is provided to an uninterruptible power supply 755, which optionally supplies power to powered ingress logic 710. In an embodiment, both the UPS 755 and the ingress logic 710 comprise in part power monitoring and management logic, indicated as CAN bus 715, each configured as a slave device. In addition, power from the UPS 755 is also supplied to a power block with gateway 225, which also comprises CAN bus master 720. The fiber 205 is manipulated as shown in FIG. 8 and discussed there, and ultimately is configured by the gateway 225 to provide at its I/O ports a WAN signal 730, for example either XGS-PON or 25G-PON and in some embodiments simply a pass-through, and also a LAN fiber signal 735, for example 10G-EPON or 25G-PON. A LAN port 740, configured as either SFP+ or SFP28 depending upon the particular configuration, can also be implemented in some embodiments, along with a copper wire LAN port 745 that can support an Open WiFi Doppler device. Further, a conventional USB port can also be provided in some embodiments, permitting connection to customer devices such as VOI phones, personal computers, flash drives, or other USB compatible devices.

Cables from power block 725, WAN 730 and LAN 735 connect to each tap 215, and thence to one or more FMC's 230. For simplicity of explanation, plates 220 are not shown in FIG. 7, and only one FMC is shown on each arm of taps 215, but it will be appreciated from the discussion of FIGS. 2-6 that multiple taps, plates and FMC's can be implemented in a wide variety of configurations. In some embodiments, a limited number of taps, for example only eight, can be daisy chained, while other embodiments are not similarly limited. As with FIGS. 2-6, various customer devices can be deployed such as TV's 265, either via patch cable or WiFi, as shown.

Figure 8:
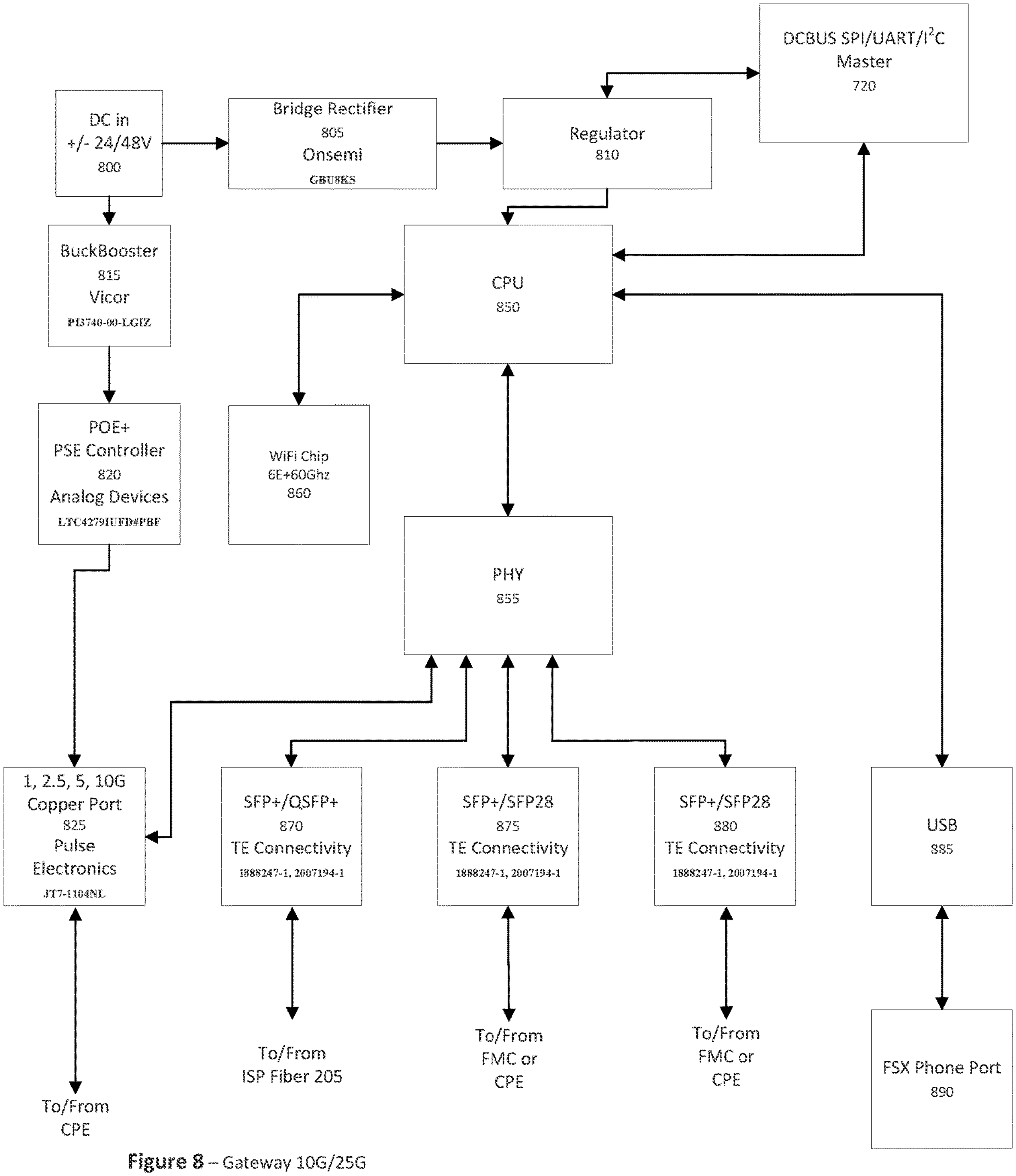
FIG. 8 illustrates in block diagram form an embodiment of a gateway in accordance with an aspect of the present invention.

Next referring to FIG. 8, the internals of an embodiment of gateway 225 are shown in block diagram form. Power comes in at power block 800, typically either plus or minus 48 volts DC. In some embodiments, to remove any ripple that might still remain in the incoming DC signal, the output from power block 800 is passed through bridge rectifier 805 and regulator 810, after which it is supplied to both CAN bus logic 720 (FIG. 7) as well as CPU 850. Further, power from block 800 is supplied to buck/boost logic 815 and then at PSE (Power Sourcing Equipment) controller 820 is injected onto a twisted pair Ethernet cable in a Power over Ethernet configuration, which can be any suitable version of POE, or in other embodiments can be SPE or PoDL. The output of PSE Controller 820 is supplied to a twisted pair Ethernet port 825, or similar.

The CPU 850 communicates with CAN bus logic 720, which can, for example, be a Yamar DS-DCCAN500 together with appropriate supporting logic, for example transceivers, UARTs and the like. The logic 720 is, in at least some embodiments, configured as a master device, and the CPU causes the logic 720 to poll the slave CAN bus logic in each the taps 215 and FMC's 230, as well as other ancillary logic, e.g. 755 and 710 (FIG. 7) to confirm that each such device remains powered up, where each device has a unique identifier associated therewith. Alternatively, the Master logic 720 can await periodic "I'm alive" messages from the slave devices. In an embodiment, the CPU 850 also also manages a WiFi chip 860 and USB port 885, to which a VOI phone 890 or similar USB compatible device can be connected. In an embodiment, the CPU also requests via the Master logic 720 the power usage detected by each CAN bus-enabled device on the network. That data is then compared to threshold power diet values appropriate to the particular implementation of the network. In the event that either a slave device fails to respond to a poll, or fails to transmit an "I'm alive" message within the allotted time window, or in the event that a device reports that the power drain in a monitored device or the arm of a network exceeds a pre-determined threshold based on safety considerations, a warning, alarm, or other signal is generated. The alarm or similar signal can be displayed on a dashboard for action by a user, or can be configured to trigger an automatic shutdown of one of more devices, or an entire arm of the network, or any other portion of the network, in some instances after performing multiple checks.

Still further, the CPU manages the physical network layer, or PHY 855, which receives signals from the ISP fiber 205 via SFP+ or QSFP+ port 870 and distributes it to copper wire Ethernet port 825 as well as one or more SFP+/SFP28 ports 875, 880. The port 825 provides POE power and data signals, whereas ports 875 and 880 supply LAN fiber signals to either to an FMC 230 or to compatible customer devices.

Figure 9:
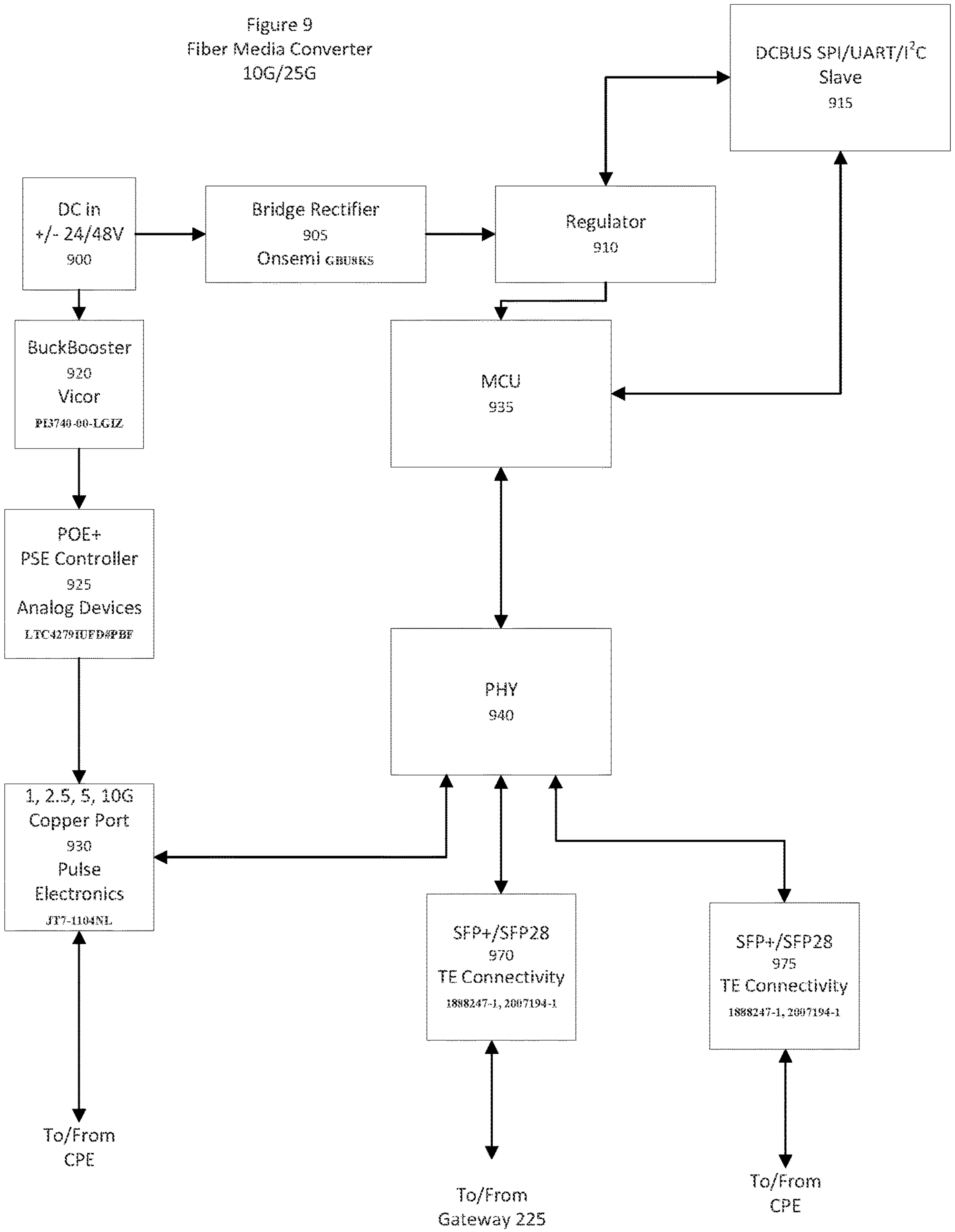
FIG. 9 illustrates in block diagram form a fiber media converter, or FMC, in accordance with an embodiment of an aspect of the invention.

Referring next to FIG. 9, the internals of an embodiment of the Fiber Media Converter 230 can be better appreciated. As with the gateway 225 shown in FIG. 8, FMC 230 can be configured for 10G, 25G, or higher data rates. Also as with gateway 225, any slight remaining ripple is removed from incoming power 900 by means of bridge is provided to a bridge rectifier 905 and regulator 905, with monitoring and management by slave CAN bus logic 915. Power block 900 also supplies power to BuckBoost logic 920 and PSE controller 925 to inject power onto a copper wire LAN connector 930. An MCU 935 manages power monitoring of itself and any connected devices by its communications and control of slave CAN bus logic 915.

Further, the MCU 935 also manages the physical layer, or PHY 940, which communicates via I/O port 970 the upstream signals from the gateway 225 in some embodiments, and directly from the ISP fiber in some embodiments. The MCU also manages the PHY 940 to provide downstream copper wire Ethernet communications via I/O port 930 and downstream fiber LAN communications via I/O port 975. I/O ports can, in an embodiment, each be configured as either SFP+ or SFP28 ports, depending upon the data rates being transmitted.

Referring next to FIG. 10, an embodiment of the power monitoring and management aspects of the taps 215 can be better appreciated. As with the FMC of FIG. 9, blocks 900, 905, 910 and 915 operate to remove ripple and provide a slave CAN bus or similar power line monitoring capability. Further, power from regulator 910 is supplied to microcontroller/MCU 935 and to power management logic 1010. The power management logic is configured to distribute power to each of multiple power output blocks 1015A, 1015B and 1015C. These provide power to the separate arms of the network connected to a specific tap (see FIG. 2, for example) to power customer devices that are compatible with the power available via the taps and FMC's, where each arm can be separately monitored for power quality and power drain. It will be appreciated by those skilled in the art that the discussion of the CAN bus functionality herein is exemplary and not limited, and numerous power monitoring and management alternatives can be used instead or in combination.

From the foregoing it can be appreciated that a new and novel gateway, fiber media converter and open fiber network configuration have been disclosed together numerous alternatives and equivalents. It will also be understood by those skilled in the art that numerous other alternatives and equivalents also exist which do not depart from the invention. As a result, the invention is not to be limited by the foregoing description but only by the appended claims.

What is claimed is:

1. An optical distribution network for providing internet access within a structure having multiple spaces comprising
- an interface configured to interface with an optical fiber internet connection from a service provider,
- at least one local optical fiber line distributed to at least some of the spaces within the structure,
- at least one local power line distributed jointly with the local optical fiber line to at least some of the spaces within the structure,
- a plurality of network branches connected to the local optical fiber line and the local power line by means of taps, at least one tap associated with each branch,
- at least one gateway configured to monitor and manage the distribution of power on the at least one local power line to each of the branches, and
- a fiber media converter connected to the at least one local optical fiber line and the at least one local power line downstream of the gateway for providing to downstream devices communications in the protocol required by those devices.

2. The optical distribution network of claim 1 wherein the interface connects to any of a demarcation point, a network boundary, or a service node interface.

3. The optical distribution network of claim 2 wherein a plurality of demarcation points is provisioned within a single structure.

4. The optical distribution network of claim 3 wherein each of the plurality of demarcation points is associated with one of the at least one gateways.

5. The optical distribution network of claim 4 wherein each of the at least one gateways provides secure internet services to an associated space.

6. The optical distribution network of claim 5 wherein the associated space is one of group comprising a condominium, an office, an apartment, a home, a room within a home, a dormitory, and a room within a dormitory.

7. The optical distribution network of claim 1 wherein the gateway comprises power monitoring logic configured as a master and at least some of the at least one optical tap and the at least one fiber media converter are configured as power monitoring slaves for monitoring power consumption on each of the plurality of branches.

8. The optical distribution network of claim 7 wherein the master-slave relationship is configured using at least one of a group of protocols comprising CANbus, Power over Data Line, and Single Pair Ethernet.

9. The optical distribution network of claim 1 wherein the gateway further comprises logic for enabling or disabling power to one or more selected branches of the network.

10. The optical distribution network of claim 1 wherein the gateway, optical tap and fiber media converter operate together to provide a locally secure network.

11. The optical distribution network of claim 1 wherein the power monitoring and management functions of the gateway are monitored and managed remotely.

12. The optical distribution network of claim 1 wherein the gateway transforms the format of communications received from an ISP into the format required for at least some customers premises equipment.

13. The optical distribution network of claim 1 wherein the gateway transforms communications received from an ISP in a first protocol into at least one of a group of protocols comprising EPON, GPON, XGS-PON, NG-PON, Copper LAN, LAN, and USB.

14. The system of claim1 wherein only one gateway is used per structure.

15. The optical distribution network of claim 1 where the local power line and the local optical fiber line are distributed within an associated structure through a microconduit.

16. A method of providing internet access within a structure allocated into multiple independent spaces comprising the steps of
- interfacing with an optical fiber internet connection provided by a service provider,
- supplying at least one local power line,
- receiving at a gateway power from the at least one local power line and communications from the optical fiber provided by the service provider,
- transforming the communications received from the service provider into a protocol usable by local downstream equipment,
- distributing from the gateway to a plurality of network branches at least one of WAN and LAN signals together with power configured to enable operation of at least some customer premises equipment, and separately monitoring power consumption on each of the network branches.

17. A system for monitoring power usage within a local optical distribution network comprising a local optical network having a plurality of branches of optical fiber, at least some of which are configured to provide internet communications to customer premises equipment, at least one gateway configured to receive power from a source and to distribute power to downstream portions of the local optical network, a local power line configured to receive power from the at least one gateway and to distribute that power across at least some of the plurality of branches adjacent to the optical fiber for enabling operation of at least some customer premises equipment, at least one optical tap per network branch configured to receive power from the local power line and optical communications via the optical fiber, at least one fiber media converter configured to receive power from an associated optical tap and to provide power to at least some downstream customer premises equipment, wherein the gateway is configured as a master device and sensors in one or more of the at least one optical tap and the at least one fiber media converter are configured as slave devices for monitoring power usage in at least some of the plurality of branches.

18. The system of claim 17 wherein the monitoring and management of power distribution is implemented using one of a group of protocols comprising CANbus, Power over Data Line, and Power-over-Ethernet.

19. The system of claim 17 wherein a series of taps are daisy-chained.

20. The system of claim 17 wherein a structure is divided into a plurality of independent spaces and at least a plurality of such independent spaces has associated therewith a gateway and at least one tap.

* * * * *